United States Patent
Deng et al.

(10) Patent No.: US 11,845,466 B2
(45) Date of Patent: Dec. 19, 2023

(54) NORMAL DISTRIBUTIONS TRANSFORM (NDT) METHOD FOR LIDAR POINT CLOUD LOCALIZATION IN UNMANNED DRIVING

(71) Applicant: SHANGHAITECH UNIVERSITY, Shanghai (CN)

(72) Inventors: Qi Deng, Shanghai (CN); Hao Sun, Shanghai (CN); Yajun Ha, Shanghai (CN); Hui Wang, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 17/802,148

(22) PCT Filed: Sep. 22, 2021

(86) PCT No.: PCT/CN2021/119506
§ 371 (c)(1),
(2) Date: Aug. 25, 2022

(87) PCT Pub. No.: WO2023/272964
PCT Pub. Date: Jan. 5, 2023

(65) Prior Publication Data
US 2023/0192123 A1   Jun. 22, 2023

(30) Foreign Application Priority Data
Jun. 28, 2021  (CN) .......................... 202110718013.2

(51) Int. Cl.
*B60W 60/00*         (2020.01)
(52) U.S. Cl.
CPC ....... *B60W 60/001* (2020.02); *B60W 2420/52* (2013.01); *B60W 2554/4049* (2020.02)
(58) Field of Classification Search
CPC ........... B60W 60/001; B60W 2420/52; B60W 2554/4049
See application file for complete search history.

(56) References Cited

U.S. PATENT DOCUMENTS

| 11,010,928 | B2* | 5/2021 | Mammou | ................. G06T 9/00 |
| 2021/0103780 | A1* | 4/2021 | Mammou | ............... G06T 11/20 |
| 2021/0264640 | A1* | 8/2021 | Mammou | ................. G06T 7/50 |

FOREIGN PATENT DOCUMENTS

| CN | 111860340 A | 10/2020 |
| CN | 111949943 A | 11/2020 |
| CN | 112946681 A | 6/2021 |

OTHER PUBLICATIONS

Srinara et al."Performance Analysis of 3D NDT Scan Matching for Autonomous Vehicles Using INS/GNSS/3D LiDAR-SLAM Integration Scheme" IEEE (Year: 2021).*

(Continued)

*Primary Examiner* — Rachid Bendidi
(74) *Attorney, Agent, or Firm* — Bayramoglu Law Offices LLC (57) ABSTRACT

A normal distributions transform (NDT) method for LiDAR point cloud localization in unmanned driving is provided. The method proposes a non-recursive, memory-efficient data structure occupation-aware-voxel-structure (OAVS), which speeds up each search operation. Compared with a tree-based structure, the proposed data structure OAVS is easy to parallelize and consumes only about ¹⁄₁₀ of memory. Based on the data structure OAVS, the method proposes a semantic-assisted OAVS-based (SEO)-NDT algorithm, which significantly reduces the number of search operations, redefines a parameter affecting the number of search operations, and removes a redundant search operation. In addition, the method proposes a streaming field-programmable gate array (FPGA) accelerator architecture, which further improves the real-time and energy-saving performance of the SEO-NDT algorithm. The method meets the real-time and high-precision requirements of smart vehicles for three-dimensional (3D) lidar localization.

3 Claims, 1 Drawing Sheet

(56) References Cited

OTHER PUBLICATIONS

Zhou et al. "NDT-Transformer: Large-Scale 3D Point Cloud Localisation using the Normal Distribution Transform Representation", IEEE (Year: 2021).*

Javanmardi et al. "Autonomous vehicle self localization based on probabilistic planar surface map and multichannel LiDAR inurban area" IEEE. (Year: 2017).*

Qi Deng, et al., An Optimized FPGA-Based Real-Time NDT for 3D-LiDAR Localization in Smart Vehicles, IEEE Transactions on Circuits and Systems—II: Express Briefs, 2021, pp. 3167-3171, vol. 68, No. 9.

Cihan Ulas, et al., A Fast and Robust Feature-Based Scan-Matching Method in 3D SLAM and the Effect of Sampling Strategies, International Journal of Advanced Robotic Systems, 2013, pp. 1-16, vol. 10, 396.

Hyunki Hong, et al., Key-layered normal distributions transform for point cloud registration, Electronics Letters, 2015, pp. 1986-1988, vol. 51, No. 24.

Todor Stoyanov, et al., Fast and accurate scan registration through minimization of the distance between compact 3D NDT representations, The International Journal of Robotics Research, 2012, pp. 1-17.

Siew-Kei Lam, et al., Area-Time Efficient Streaming Architecture for FAST and BRIEF Detector, IEEE Transactions on Circuits and Systems—II: Express Briefs, 2018.

Anestis Zaganidis, et al., Semantically Assisted Loop Closure in SLAM Using NDT Histograms, IEEE/RSJ International Conference on Intelligent Robots and Systems (IROS), 2019, pp. 4562-4568.

Lin Bai, et al., RoadNet-RT: High Throughput CNN Architecture and SoC Design for Real-Time Road Segmentation, IEEE Transactions on Circuits and Systems—I: Regular Papers, 2021, pp. 704-714, vol. 68, No. 2.

Xuepeng Chang, et al., A Mixed-Pruning Based Framework for Embedded Convolutional Neural Network Acceleration, IEEE Transactions on Circuits and Systems—I: Regular Papers, 2021, pp. 1706-1715, vol. 68, No. 4.

Hongtu Zhang, et al., A 55nm, 0.4V 5526-TOPS/W Compute-in-Memory Binarized CNN Accelerator for AIoT Applications, IEEE Transactions on Circuits and Systems—II: Express Briefs, 2021, pp. 1695-1699, vol. 68, No. 5.

* cited by examiner

NORMAL DISTRIBUTIONS TRANSFORM (NDT) METHOD FOR LIDAR POINT CLOUD LOCALIZATION IN UNMANNED DRIVING

CROSS REFERENCE TO THE RELATED APPLICATIONS

This application is the national phase entry of International Application No. PCT/CN2021/119506, filed on Sep. 22, 2021, which is based upon and claims priority to Chinese Patent Application No. 202110718013.2, filed on Jun. 28, 2021, the entire contents of which are incorporated herein by reference.

TECHNICAL FIELD

The present disclosure relates to a three-dimensional (3D) point cloud localization technology, and in particular to a normal distributions transform (NDT) method for LiDAR point cloud localization in unmanned driving.

BACKGROUND

The normal distributions transform (NDT) algorithm is widely used to register two-dimensional (2D) or three-dimensional (3D) point clouds in smart vehicles, 3D reconstruction, motion estimation, object detection and pose estimation, simultaneous localization and mapping (SLAM), etc. In the field of smart vehicles, localization is the most basic and important task, and the NDT-based localization system is widely used in autonomous driving systems using a lidar as the main sensor.

The NDT algorithm segments a target point cloud into a series of grids and uses a normal distribution to represent the distribution of points in each point cloud. It converts point cloud to point cloud registration into point cloud to normal distribution registration, thereby improving the speed and robustness of the algorithm.

The current autonomous driving system usually uses a lidar of 64, 128 or more channels as the main sensor of the localization algorithm. The sampling frequency of the lidar is gradually increased, and will reach 30 Hz in the future. In other words, the number of points input by the lidar per second will be close to one million, which poses a great challenge to the real-time performance of the localization system. A test shows that the traditional NDT algorithm can only reach the input frequency of 2 Hz on an embedded advanced reduced instruction-set computer (RISC) machine (ARM) platform, which is far from meeting the real-time requirement.

To this end, researchers are pursuing two primary goals. The first goal is to reduce the number of search iterations. Reference [1] proposed a multi-layered NDT algorithm to represent point clouds in order to reduce the number of iterations and measure longer distances. However, updating the NDT of all layers requires too much memory and unacceptable time. Reference [2] made improvements on Reference [1] and proposed a key-layered NDT algorithm, which only needs to search the key layer to satisfy the termination conditions of higher layers. Unfortunately, this method cannot meet the real-time requirement. The second goal is to reduce the running time per iteration. References [3] and [4] extended the point-to-distribution (P2D)-NDT to distribution-to-distribution (D2D)-NDT, thereby transforming a set of points into a distribution to reduce the running time per iteration. However, the D2D-NDT method suffers from poor accuracy and slow speed when dealing with massive and non-uniform lidar point clouds in smart vehicles. Reference [5] proposed semantic-assisted (SE)-NDT to classify point clouds and remove dynamic objects by using segmentation methods [6], [7] and [8]. However, the method proposed by Reference [5] can only remove a limited number of points and requires additional time for point cloud segmentation. Overall, these methods lack real-time performance when dealing with large point clouds.

With the increase in the number of point clouds generated by the new generation of lidar and the increase in the running speed of autonomous vehicles, it is increasingly difficult for the NDT algorithm running on the vehicle-mounted industrial computer to meet the real-time requirement. In addition, the strict constraint on the use of batteries by smart vehicles also puts forward an energy consumption requirement for the NDT algorithm. In this context, it is necessary to design an improved NDT algorithm, based on the distribution of laser point clouds in an autonomous driving scenario, to accelerate the localization process through an energy-efficient heterogeneous computing device, such as a field-programmable gate array (FPGA) or a graphics processing unit (GPU).

[1] C. Ulas and H. Temeltas, "A fast and robust feature-based scan-matching method in 3d slam and the effect of sampling strategies," 2013.

[2] H. Hong and B. H. Lee, "Key-layered normal distributions transform for point cloud registration," Electronics Letters, vol. 51, no. 24, p. 1986-1988, 2015.

[3] T. Stoyanov, M. Magnusson, H. Andreasson, and A. J. Lilienthal, "Fast and accurate scan registration through minimization of the distance between compact 3d ndt representations," The International Journal of Robotics Research, vol. 31, no. 12, p. 1377-1393, October 2012.

[4] S. Lam, G. Jiang, M. Wu, and B. Cao, "Area-time efficient streaming architecture for fast and brief detector," IEEE Transactions on Circuits and Systems II: Express Briefs, vol. 66, no. 2, pp. 282-286, February 2019.

[5] A. Zaganidis, A. Zerntev, T. Duckett, and G. Cielniak, "Semantically assisted loop closure in slam using ndt histograms," 2019 IEEE/RSJ International Conference on Intelligent Robots and Systems (IROS), 2019.

[6] L. Bai, Y Lyu, and X. Huang, "Roadnet-rt: High throughput cnn architecture and soc design for real-time road segmentation," IEEE Transactions on Circuits and Systems I: Regular Papers, vol. 68, no. 2, p. 704-714, February 2021.

[7] X. Chang, H. Pan, W. Lin, and H. Gao, "A mixed-pruning based framework for embedded convolutional neural network acceleration," IEEE Transactions on Circuits and Systems I: Regular Papers, p. 1-10, 2021.

[8] H. Zhang, Y Shu, W. Jiang, Z. Yin, W. Zhao, and Y Ha, "A 55 nm, 0.4v 5526-tops/w compute-in-memory binarized cnn accelerator for aiot applications," IEEE Transactions on Circuits and Systems II: Express Briefs, pp. 1-1, 2021.

SUMMARY

In order to meet the requirements of unmanned driving for real-time and efficient localization data, the present disclosure proposes a normal distributions transform (NDT) method for LiDAR point cloud localization in unmanned driving. The present disclosure establishes a non-recursive, memory-efficient data structure occupation-aware-voxel-structure (OAVS), which meets the real-time and high-precision requirements of smart vehicles for three-dimensional (3D) lidar localization.

The present disclosure adopts the following technical solution: an NDT method for LiDAR point cloud localization in unmanned driving. The method specifically includes the following steps:

1) establishing a data structure OAVS:
   1.1) defining a point cloud input by a lidar in a previous scan as a fixed point cloud $P_F$, and calculating, according to the input fixed point cloud $P_F$, an axially aligned bounding box of the input fixed point cloud $P_F$;
   1.2) segmenting, according to a preset scale parameter $R_1$, the axially aligned bounding box calculated in step 1.1) into a series of 3D spatial volumes with a side length of $R_1$, and defining each of the 3D spatial volumes with a side length of $R_1$ as a voxel; and
   1.3) calculating a count of points in each voxel; segmenting a voxel with a count of points exceeding a threshold $Th_p$ into a series of 3D spatial volumes with a side length of $R_2$, $R_2<R_1$; and defining each of the 3D spatial volumes with a side length of $R_2$ as a sub-voxel, which, together with the voxel, forms the data structure OAVS; and
2) acquiring NDT information of the fixed point cloud based on the data structure OAVS, and optimizing a search operation to improve a real-time performance of an NDT algorithm:
   2.1) segmenting the fixed point cloud $P_F$, and extracting, by an open-source neural network Cylinder3D for point cloud segmentation, different classes of objects identified in the fixed point cloud;
   2.2) acquiring the NDT information of the fixed point cloud $P_F$, and calculating the NDT information of each class of point set in each sub-voxel in the data structure OAVS corresponding to the fixed point cloud $P_F$, namely a mean and a variance for each class in each sub-voxel;
   2.3) registering a moving point cloud $P_M$ with the fixed point cloud $P_F$ having the NDT information acquired:
   performing the following operations for each point $p_M^i$ in the moving point cloud:
   2.3.1) transforming, according to a pose transformation matrix T, the point $p_M^i$ into a coordinate system of the fixed point cloud to acquire a transformed point $\hat{p}_M^i=T\times p_M^i$, thereby acquiring a registered moving point cloud $\hat{p}_M^i$ in the coordinate system of the fixed point cloud;
   2.3.2) searching, in the sub-voxel of the fixed point cloud, a sub-voxel o where $\hat{p}_M^i$ is located, and calculating, based on a class j to which $\hat{p}_M^i$ belongs, a probability that $\hat{p}_M^i$ matches a normal distribution of the sub-voxel:

$$\rho(\hat{p}_M^i) = \frac{1}{\sqrt{(2\pi)^3|(\Sigma)_{oj}|}} \exp\left(-\frac{(\hat{p}_M^i - \mu_{oj})^T \left(\sum_{oj}\right)^{-1}(\hat{p}_M^i - \mu_{oj})}{2}\right),$$

where, $(\hat{p}_M^i-\mu_{oj})^T \Sigma_o^{-1} (\hat{p}_M^i-\mu_{oj})$ represents a transpose matrix of $(\hat{p}_M^i-\mu_{oj})$ multiplied by an inverse matrix of $\Sigma_{oj}$ and multiplied by $(\hat{p}_M^i-\mu_{oj})$; $\mu_{ij}$ represents the mean of the class j in the sub-voxel o; and $\Sigma_{oj}$ represents the variance of the class j in the sub-voxel o;

2.3.3) acquiring a total matching score by $$score = \sum_{p_M^i \in P_M} \rho(T \times p_M^i)$$

according to the probability calculated in step 2.3.2), where, the pose transformation matrix T is solved by a Newton-Gauss iteration method in order for an optimal pose transformation matrix T and an optimal matching score;

2.3.4) denoting a first derivative gradient matrix of the score function as $\vec{g}$ and a second derivative Hessian matrix thereof as H;

2.3.5) solving $H\Delta T = -\vec{g}$ to obtain an increment $\Delta T$ of a pose rotation matrix T;

2.3.6) updating the pose rotation matrix T by $T \leftarrow T+\Delta T$;

2.3.7) returning to step 2.3.1) if the score function does not converge below a desired threshold, that is, a matching degree between the moving point cloud $P_M$ and the fixed point cloud $P_F$ is not as desired, redefining the pose transformation matrix T by the pose rotation matrix T updated in step 2.3.6), and repeating steps 2.3.1) to 2.3.6) until the score function converges below the desired threshold; and 2.3.8) taking a final pose transformation matrix T obtained in step 2.3.7) as the pose transformation matrix of the moving point cloud relative to the fixed point cloud.

Further, in step 2.2), during acquiring the NDT information, the segmented fixed point cloud may be streamed into an FPGA accelerator to establish the data structure OAVS, that is, to perform step 1), and to calculate the NDT information of each sub-voxel.

Further, in step 2.3), in a registration stage, the segmented moving point cloud may be streamed into the FPGA accelerator to be efficiently processed in the form of data stream and pipeline, so as to obtain the gradient matrix and the Hessian matrix.

The present disclosure has the following beneficial effects. The present disclosure proposes a non-recursive, memory-efficient data structure OAVS that speeds up each search operation. Compared with a tree-based structure, the proposed data structure OAVS is easy to parallelize and consumes only about 1/10 of memory. Based on the data structure OAVS, the present disclosure proposes a semantic-assisted OAVS-based (SEO)-NDT algorithm, which significantly reduces the number of search operations, redefines a parameter affecting the number of search operations, and removes a redundant search operation. In addition, the present disclosure proposes a streaming FPGA accelerator architecture, which further improves the real-time and energy-saving performance of the SEO-NDT algorithm.

DETAILED DESCRIPTION OF THE EMBODIMENTS

Figure 1:
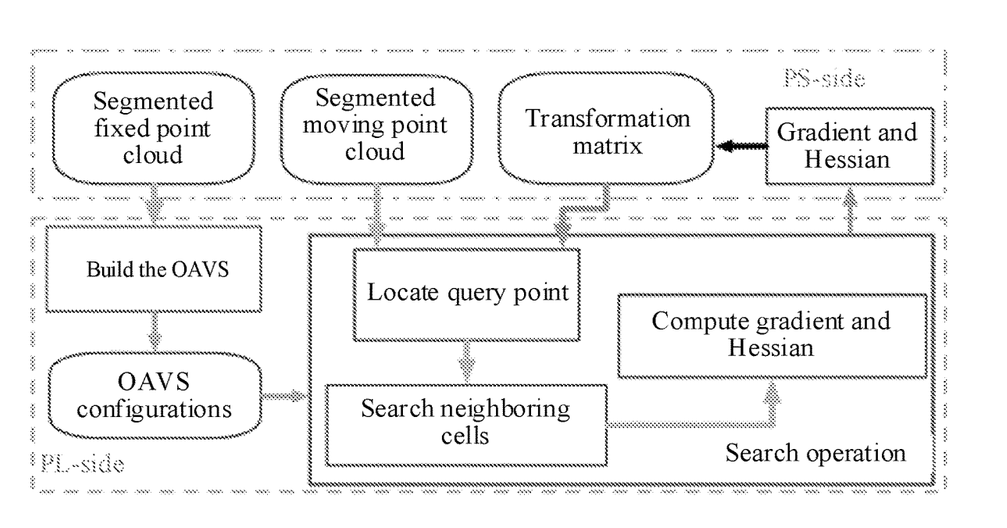
The FIGURE is a diagram of a collaboration framework of a normal distributions transform (NDT) method for LiDAR point cloud localization in unmanned driving according to the present disclosure.

The present disclosure will be described in detail below with reference to the drawings and specific embodiments. The embodiments are implemented on the premise of the technical solutions of the present disclosure. The following presents detailed implementations and specific operation processes. The protection scope of the present disclosure, however, is not limited to the following embodiments.

The present disclosure provides a normal distributions transform (NDT) method for LiDAR point cloud localization in unmanned driving, which is implemented on a field-programmable gate array (FPGA) through a high-level synthesis tool. The present disclosure establishes a non-recursive, memory-efficient data structure occupation-aware-voxel-structure (OAVS), a real-time semantic-assisted OAVS-based (SEO)-NDT algorithm based on OAVS, and a streaming FPGA accelerator architecture. The method specifically includes the following steps:

1) Establish a data structure OAVS:

1.1. Calculate, according to the input fixed point cloud $P_F$, an axially aligned bounding box (AABB) of an input fixed point cloud $P_F$.

1.2) Segment, according to a preset scale parameter $R_1$, the axially aligned bounding box calculated in the previous step into a series of 3D spatial volumes with a side length of $R_1$, and define each of the 3D spatial volumes with a side length of $R_1$ as a voxel.

1.3. Calculate a count of points in each voxel; segment a voxel with a count of points exceeding a threshold $Th_p$ into a series of 3D spatial volumes with a side length of $R_2$, $R_2 < R1$; and define each of the 3D spatial volumes with a side length of $R_2$ as a sub-voxel, which, together with the voxel, forms the data structure OAVS.

2. Establish an SEO-NDT algorithm based on the data structure OAVS:

2.1 Define a point cloud input by a lidar in a previous scan as a fixed point cloud $P_F$: segment the fixed point cloud $P_F$, and extract, by an open-source neural network Cylinder3D for point cloud segmentation, different classes of objects identified in the fixed point cloud. Here, the point cloud is segmented into 24 classes, namely 1) vehicles, 2) bicycles, 3) motorcycles, 4) trucks, 5) other vehicles, 6) people, 7) cyclists, 8) motorcyclists, 9) road surfaces, 10) stop lines, 11) zebra crossings, 12) other ground surfaces, 13) buildings, 14) fences, 15) green vegetation, 16) tree trunks, 17) ramps, 18) road signs, 19) traffic signs, 20) moving vehicles, 21) moving people, 22) moving bicycles, 23) moving trucks, and 24) other moving vehicles.

2.2 Acquire NDT information of the fixed point cloud $P_F$: calculate the NDT information of each class of point set in each sub-voxel in the data structure OAVS corresponding to the fixed point cloud $P_F$, namely a mean and a variance for each class in each sub-voxel, where the mean is $$\mu_{oj} = \frac{1}{m}\sum_{k=1}^{m} p_{koj},$$

and the variance is $$\left(\sum\right)_{oj} = \frac{1}{m-1} \sum_{k=1}^{m} (p_{koj} - \mu_{oj})(p_{koj} - \mu_{oj})^T;  \quad 5$$

the subscript o represents an o-th sub-voxel; the subscript j represents a j-th class; the subscript k represents a k-th point in the sub-voxel; $p_{koi}$ represents coordinates (x,y,z) of the k-th point in a point set of the j-th class in the o-th sub-voxel; m represents a count of points in the point set of the j-th class in the o-th sub-voxel; and $(p_{koi}-\mu_{oi})^T$ represents a transpose matrix of $(p_{koi}-\mu_{oi})$. If there are multiple classes of point clouds in a certain sub-voxel, the NDT information of all classes of point sets in the sub-voxel is calculated. That is, the counts of means and variances obtained are corresponding to the count of classes of the point clouds in the sub-voxel.

2.3 Register a moving point cloud $P_M$ with the fixed point cloud $P_F$ having the NDT information acquired: perform the following operations for each point $p_M^i$ in the moving point cloud:

2.3.1 Transform, according to a pose transformation matrix T, the point $p_M^i$ into a coordinate system of the fixed point cloud to acquire a transformed point $\hat{p}_M^i = T \times p_M^i$, thereby acquiring a registered moving point cloud $\hat{p}_M^i$ in the coordinate system of the fixed point cloud.

2.3.2 Search, in the sub-voxel of the fixed point cloud, a sub-voxel o where $\hat{p}_M^i$ is located, and calculating, based on a class j to which $\hat{p}_M^i$ belongs, a probability that $\hat{p}_M^i$ matches a normal distribution of the sub-voxel:

$$\rho(\hat{p}_M^i) = \frac{2}{\sqrt{(2\pi)^3|\Sigma_{oj}|}} \exp\left(-\frac{(\hat{p}_M^i - \mu_{oj})^T \left(\Sigma_{oj}\right)^{-1} (\hat{p}_M^i - \mu_{oj})}{2}\right).$$

where, $(\hat{p}_M^i-\mu_{oj})^T\Sigma_o^{-1}(\hat{p}_M^i-\mu_{oj})$ represents a transpose matrix of $(\hat{p}_M^i-\mu_{oj})$ multiplied by an inverse matrix of $\Sigma_{oj}$ and multiplied by $(\hat{p}_M^i-\mu_{oj})$.

2.3.3 Acquire a total matching score by $$score = \sum_{p_M^i \in P_M} \rho(T \times p_M^i)$$

according to the probability, where, the pose transformation matrix T is solved by a Newton-Gauss iteration method in order for an optimal pose transformation matrix T and an optimal matching score.

2.3.4 Denote a first derivative gradient matrix of the score function as $\vec{g}$ and a second derivative Hessian matrix thereof as H.

2.3.5 Solve $H\Delta T=-\vec{g}$ to obtain an increment $\Delta T$ of a pose rotation matrix T.

2.3.6 Update the pose rotation matrix T by $T \leftarrow T+\Delta T$.

2.3.7 Return to step 2.3.1 if the score function does not converge below a desired threshold, that is, a matching degree between the moving point cloud $P_M$ and the fixed point cloud $P_F$ is not as desired, redefine the pose transformation matrix T by the pose rotation matrix T updated in step 2.3.6, and repeat steps 2.3.1 to 2.3.6 until the score function converges below the desired threshold.

2.3.8 Take a final pose transformation matrix T obtained in step 2.3.7 as the pose transformation matrix of the moving point cloud relative to the fixed point cloud.

The pseudocode of the algorithm is as follows:

```
            Algorithm 1: SEO-NDT algorithm
              for point cloud registration 1.   Input: fixed point cloud P_F, moving point
     cloud P_M, initial transformation matrix T_init,
     point cloud segmenter D
2.   Output: transformation matrix T, T×(P_M)→P_F
3.   {segment:};
4.   Mark P_F and P_M by D, and obtain point
     clouds L_F and L_M marked by D;
5.   {initialize:};
6.   Establish OAVS O for P_F;
7.   forall marked point p_F^i ∈ P_F, do
8.   |  Search sub-voxel o^i ∈ O including p_F^i;
9.   |  Update μ_o and Σ_o of o^i;
10.  end
11.  {register:};
12.  Initialize the transformation matrix: T←T_init;
13.  while the function does not converge, do
14.  |  score←0, g→0, H←0;
15.  |  forall, mark class d ∈ D, do
16.  |  |  forall, class-d point p_M^i ∈ P_M, do
17.  |  |  |  Transform p_M^i to the coordinate
     |  |  |  system the fixed point cloud
     |  |  |  by the transformation
     |  |  |  matrix T, p̂_M^i = T × p_M^i;
18.  |  |  |  Search sub-voxel o^i where p̂_M^i is located;
19.  |  |  |  Calculate probability p(p̂_M^i);
20.  |  |  |  Update g→ and H;
21.  |  |  end
22.  |  end
23.  |  Solve HΔT = -g→; T ← T + ΔT ;
24.  end
```

The streaming FPGA accelerator architecture is shown in the FIGURE. During acquiring the NDT information, the segmented fixed point cloud is streamed into an FPGA accelerator to establish the data structure OAVS and calculate the NDT information of each sub-voxel. In a registration stage, the segmented moving point cloud is streamed into the FPGA accelerator to be efficiently processed in the form of data stream and pipeline, so as to obtain the gradient matrix and the Hessian matrix.

The above described are merely several embodiments of the present invention. Although these embodiments are described specifically and in detail, they should not be construed as a limitation to the patent scope of the present disclosure. It should be noted that those of ordinary skill in the art may further make several variations and improvements without departing from the idea of the present disclosure, but such variations and improvements should all fall within the protection scope of the present disclosure. Therefore, the protection scope of the present disclosure should be subject to the appended claims.

What is claimed is:

1. A normal distributions transform (NDT) method for LiDAR point cloud localization in unmanned driving, wherein the NDT method is performed by field-programmable gate array (FPGA), comprising the following steps:
  1) Establishing, by the FPGA, a data structure occupation-aware-voxel-structure (OAVS):
    1.1) defining a point cloud input by a lidar in a previous scan as a fixed point cloud $p_F$ nd calculating, according to the input fixed point cloud $p_F$, an axially aligned bounding box of the input fixed point cloud $p_F$;
    1.2) segmenting, according to a preset scale parameter $R_1$, the axially aligned bounding box calculated in step 1.1) into a series of three-dimensional (3D) spatial volumes with a side length of $R_1$, and defining each of the 3D spatial volumes with the side length of $R_1$ as a voxel; and
    1.3) calculating a count of points in each voxel; segmenting a voxel with a count of points exceeding a threshold $Th_p$ into a series of 3D spatial volumes with a side length of $R_2$, wherein $R_2<R_1$; and defining each of the 3D spatial volumes with the side length of $R_2$ as a sub-voxel, which, together with the voxel, forms the data structure OAVS; and
  2) Acquiring, by the FPGA, NDT information of the fixed point cloud based on the data structure OAVS, and optimizing a search operation to improve a real-time performance of an NDT algorithm:
    2.1) segmenting the fixed point cloud $p_F$, and extracting, by an open-source neural network Cylinder3D for point cloud segmentation, different classes of objects identified in the fixed point cloud;
    2.2) acquiring the NDT information of the fixed point cloud $p_F$, and calculating NDT information of each class of a point set in each sub-voxel in the data structure OAVS corresponding to the fixed point cloud $p_F$, namely a mean and a variance for each class in each sub-voxel;
    2.3) registering a moving point cloud $p_M$ with the fixed point cloud $p_F$ having the NDT information acquired: performing the following operations for each point $p_M^i$ in the moving point cloud:
      2.3.1) transforming, according to a pose transformation matrix T, the point $p_M^i$ into a coordinate system of the fixed point cloud to acquire a transformed point $\hat{p}_M^i = T \times p_i^M$, thereby acquiring a registered moving point cloud $\hat{p}_M^i$ in the coordinate system of the fixed point cloud;
      2.3.2) searching, in the sub-voxels of the fixed point cloud, a sub-voxel o where $\hat{p}_M^i$ is located, and calculating, based on a class j to which $\hat{p}^i_M$ belongs, a probability that $\hat{p}^i_M$ matches a normal distribution of the sub-voxel:

$$\rho(\hat{p}^i_M) = \frac{1}{\sqrt{(2\pi)^3|\sum_{oj}|}} \exp\left(-\frac{(\hat{p}^i_M - \mu_{oj})^T \left(\sum_{oj}\right)^{-1} (\hat{p}^i_M - \mu_{oj})}{2}\right),$$

wherein, $(\hat{p}^i_M - \mu_{oj})^T \Sigma_o^{-1} (\hat{p}^i_M - \mu_{oj})$ represents a transpose matrix of $(\hat{p}^i_M - \mu_{oj})$ multiplied by an inverse matrix of $\Sigma_{oj}$ and multiplied by $(\hat{p}^i_M - \mu_{oj})$; $\mu_{oj}$ represents a mean of the class j in the sub-voxel o; and $\Sigma_{oj}$ represents a variance of the class j in the sub-voxel o;

2.3.3) acquiring a total matching score by $$\text{score} = \sum_{p^i_M \in P_M} \rho(T \times p^i_M)$$

according to the probability calculated in step 2.3.2), wherein, the pose transformation matrix T is solved by a Newton-Gauss iteration method in order for an optimal pose transformation matrix T and an optimal matching score;

2.3.4) denoting a first derivative gradient matrix of a score function as $\vec{g}$ and a second derivative Hessian matrix thereof as H;

2.3.5) solving $H\Delta T = -\vec{g}$ to obtain an increment $\Delta T$ of a pose rotation matrix T;

2.3.6) updating the pose rotation matrix T by $T \rightarrow T + \Delta T$;

2.3.7) returning to step 2.3.1) if the score function does not converge below a desired threshold, that is, a matching degree between the moving point cloud $p_M$ and the fixed point cloud $p_F$ is not as desired, redefining the pose transformation matrix T by the pose rotation matrix T updated in step 2.3.6), and repeating steps 2.3.1) to 2.3.6) until the score function converges below the desired threshold;

2.3.8) taking a final pose transformation matrix T obtained in step 2.3.7) as the pose transformation matrix of the moving point cloud relative to the fixed point cloud; and 3) Driving, by the FPGA, an unmanned smart vehicle by means of the localization data obtained from the pose transformation matrix of the moving point cloud relative to the fixed point cloud.

2. The NDT method for LiDAR point cloud localization in unmanned driving according to claim 1, wherein in step 2.2), during acquiring the NDT information, a segmented fixed point cloud is streamed into a field-programmable gate array (FPGA) accelerator to establish the data structure OAVS, that is, to perform step 1), and to calculate the NDT information of each sub-voxel.

3. The NDT method for LiDAR point cloud localization in unmanned driving according to claim 2, wherein in step 2.3), in a registration stage, a segmented moving point cloud is streamed into the FPGA accelerator to be efficiently processed in a form of a data stream and a pipeline to obtain the gradient matrix and the Hessian matrix.

* * * * *